United States Patent [19]

Whittenberger

[11] Patent Number: 5,441,706
[45] Date of Patent: Aug. 15, 1995

[54] COMBINED ELECTRICALLY HEATABLE CONVERTER BODY

[75] Inventor: William A. Whittenberger, Leavittsburg, Ohio

[73] Assignee: W. R. Grace & Co.-Conn., New York, N.Y.

[21] Appl. No.: 282,074

[22] Filed: Jul. 28, 1994

Related U.S. Application Data

[63] Continuation-in-part of Ser. No. 66,887, May 5, 1993, abandoned.

[51] Int. Cl.6 ............................................. F01N 3/10
[52] U.S. Cl. ..................... 422/174; 422/180; 422/199; 502/439; 502/527; 60/300; 55/DIG. 30
[58] Field of Search ............ 422/174, 179, 199, 180; 502/439, 527; 60/300; 55/DIG. 30

[56] References Cited

U.S. PATENT DOCUMENTS

| | | | |
|---|---|---|---|
| 3,768,982 | 10/1973 | Kitzner et al. | 422/174 |
| 3,770,389 | 10/1973 | Kitzner et al. | 422/174 |
| 4,934,142 | 6/1990 | Hayashi et al. | 422/174 |
| 4,976,929 | 12/1990 | Cornelism et al. | 422/174 |
| 4,985,210 | 1/1991 | Minami | 422/171 |
| 5,146,743 | 9/1992 | Maus et al. | 422/174 |
| 5,149,508 | 9/1992 | Bullock | 422/174 |
| 5,232,671 | 8/1993 | Brunson et al. | 422/174 |

FOREIGN PATENT DOCUMENTS

| | | |
|---|---|---|
| 0483708 | 5/1992 | European Pat. Off. |
| 4017360 | 12/1991 | Germany |
| 4102890 | 8/1992 | Germany |
| 9208883 | 5/1992 | WIPO |
| 9321431 | 10/1993 | WIPO |

Primary Examiner—Robert J. Warden
Assistant Examiner—Hien Tran
Attorney, Agent, or Firm—Beverly J. Artale

[57] ABSTRACT

There is provided an improved combined electrically heatable and light-off converter which is characterized by an integral intertwining structure wherein thin metal strips form a multicellular converter body. A first plurality of the thin metal strips extend the entire axial length of the converter body and are usually corrugated, and a second plurality of thin metal strips usually flat, alternating with the first plurality, extend less than the full axial length of the converter body.

49 Claims, 5 Drawing Sheets

COMBINED ELECTRICALLY HEATABLE CONVERTER BODY

RELATED APPLICATION

This application is a continuation-in-part of my application U.S. Ser. No. 08/066,887, filed 25 May 1993, now abondoned.

BACKGROUND OF THE INVENTION AND PRIOR ART

This invention will be described in connection with embodiments especially adapted for use in exhaust lines from various types of engines, e.g., internal combustion engines of the spark ignited or compression ignited types, stationary or mobile, or gas turbine engines. It will be understood, however, that the converters of the present invention may be used to effect various chemical reactions, particularly those occurring in fluid streams, especially gas streams, which reactions are catalyzed or uncatalyzed.

Turning now to converters especially useful in exhaust lines extending from internal combustion engines, e.g., those used in automotive vehicles, the purpose of such catalytic converters is to convert pollutant materials present in the exhaust stream, e.g., carbon monoxide, unburned hydrocarbons, nitrogen oxides, etc., to carbon dioxide, nitrogen and water prior to discharge into the atmosphere. Conventional automotive catalytic converters utilize an oval or circular cross-section ceramic honeycomb monolith having square or triangular straight-through openings or cells with catalyst deposited on the walls of the cells; catalyst coated refractory metal oxide beads or pellets, e.g., alumina beads; or a corrugated thin metal foil multicelled honeycomb monolith, e.g., a stainless steel foil honeycomb monolith, having a refractory metal oxide coating and catalyst carried on said coating and supported on the surfaces of the cells. The catalyst is normally a noble metal, e.g., platinum, palladium, rhodium, ruthenium, indium, or a mixture of two or more of such metals. Zeolite coatings may also be used for the adsorption and desorption of pollutants to aid in their removal. The catalyst catalyzes a chemical reaction, mainly oxidation, whereby the pollutant is converted to a harmless by-product which passes through the exhaust system to the atmosphere.

However, conversion to such harmless by-products is not efficiently initially when the exhaust gases are relatively cold, e.g., at cold engine start. To be effective at a high conversion rate, the catalyst and the surface of the converter which the exhaust gases contact must be at or above a minimum temperature, e.g., 390 degrees F. for carbon monoxide, 570 degrees F. for volatile organic compounds, and about 900 degrees F. for methane or natural gas. Otherwise, conversion to harmless by-products is poor and cold start pollution of the atmosphere is high. It has been estimated that as much as 80% of the atmospheric pollution caused by vehicles, even though equipped with conventional non-electrically heated catalytic converters, occurs in the first two minutes of operation of the engine from cold start. Once the exhaust system has reached its normal operating temperature, a non-electrically heated catalytic converter is optimally effective. Hence, it is necessary for the relatively cold exhaust gases to make contact with hot catalyst so as to effect satisfactory conversion. Compression ignited engines, spark ignited engines, reactors in gas turbines, small bore engines such as used in lawn mowers, trimmers, boat engines, and the like have this need.

To achieve initial heating of the catalyst at engine start-up, there is conveniently provided an electrically heatable catalytic converter unit, preferably one formed of a thin metal honeycomb monolith. This monolith may be formed of spaced flat thin metal strips, straight-through non-nesting corrugated thin metal strips, pattern corrugated thin metal strips, e.g., herringbone or chevron corrugated thin metal strips, or variable pitch corrugated thin metal strips (such as disclosed in U.S. Pat. No. 4,810,588, dated 7 Mar. 1989 to Bullock et al) perforated, or imperforated, or a combination thereof, defining a multiplicity of cells through which a fluid may flow, e.g., exhaust gas. The cells may be straight-through, e.g., parallel to the axis of the device, or slightly canted relative to the axis of the device. The monolith may be connected to a 12 volt to 108 volt or higher, AC or DC supply, single or multi-phase, preferably at the time of engine start-up and afterwards to elevate the catalyst to and maintain the catalyst at at least 650° F. plus or minus 30° F. Alternatively, power may also be supplied for a few seconds prior to engine start-up. These devices may also be connected to an alternator of an internal combustion engine, for example.

Catalytic converters containing a corrugated thin metal (stainless steel) monolith have been known since at least the early 1970's. See Kitzner U.S. Pat. Nos. 3,768,982 and 3,770,389 each dated 30 Oct. 1973. More recently, corrugated thin metal monoliths have been disclosed in U.S. Pat. No. 4,711,009 dated 8 Dec. 1987 to Cornellson et al; U.S. Pat. Nos. 4,152,302 dated 1 May 1979, 4,273,681 dated 16 Jun. 1981, 4,282,186 dated 4 Aug. 1981, 4,381,590 dated 3 May 1983, 4,400,860 dated 30 Aug. 1983, 4,519,120 dated 28 May 1985, 4,521,947 dated 11 Jun. 1985, 4,647,435 dated 3 Mar. 1987, 4,665,051 dated 12 May 1987 all to Nonnenmann alone or with another; U.S. Pat. Nos. 5,070,694 dated 10 Dec. 1991 to Whittenberger; International PCT Publication Nos. WO 89/10470 (EP 412,086) and WO 89/10471 (EP 412,103) each filed 2 Nov. 1989, claiming a priority date of 25 Apr. 1988. The above International Publication Numbers disclose methods and apparatus for increasing the internal resistance of the device by placing spaced discs in series, or electrically insulating intermediate layers. Another International PCT Publication is WO 90/12951 published 9 Apr. 1990 and claiming a priority date of 21 Apr. 1989, which seeks to improve axial strength by form locking layers of insulated plates. Another reference which seeks to improve axial strength is U.S. Pat. No. 5,055,275 dated 8 Oct. 1991 Kannainian et al. Reference may also be had to PCT Publication No. WO 92/13636 filed 29 Jan. 1992 claiming a priority date of 31 Jan. 1991. This application relates to a honeycomb body along an axis of which fluid can flow through a plurality of channels. The honeycomb has at least two discs in spaced relation to each other. According to the specification, there is at least one bar type support near the axis by which the discs are connected together and mutually supported. The invention is said to make possible design of the first disc for fast heating up through exhaust gas passing through or applied electrical current. The honeycomb body serves as a bearer for catalyst in the exhaust system of an internal combustion engine. Another reference is German Patent Application No. 4,102,890 A1 filed 31 Jan. 1991 and published 6 Aug. 1992. This application discloses a spirally wound corrugated and flat strip combination wherein the flat strip contains slots and perforations and is electrically heatable. The flat strips include a bridge between leading and trailing portions. Groups of such strips are separated by insulation means. The core is provided with a pair of circular retainer segments which are separated by insulation means. No end tabs are provided, and the flat strip portions are undivided. Another reference is U.S. Pat. No. 5,102,743 dated 7 Apr. 1992. This patent disclosed a honeycomb catalyst carrier body of round, oval or elliptical cross section including a jacket tube and a stack of at least partially structured sheet-metal layers intertwined in different directions in the jacket tube. The stack has a given length and a given width. At least one of the sheet metal layers has a greater thickness over at least part of one of the dimensions than others of the layers. Such at least one layer is formed of thicker metal or of a plurality of identically structured metal sheets in contiguous relation.

Still another reference is the patent to Maus et al U.S. Pat. No. 5,146,743 dated 15 Sep. 1992 which discloses a system including a main catalyst and an electrically heatable pre-catalyst disposed upstream of the main catalyst.

A common problem with prior devices has been their inability to survive severe automotive industry durability tests which are known as the Hot Shake Test and the Hot Cycling Test.

The Hot Shake test involves oscillating (100 to 200 Hertz and 28 to 60 G inertial loading) the device in a vertical attitude at a high temperature (between 800 and 1100 degrees C.; 1472 to 2012 degrees F., respectively) with exhaust gas from a running internal combustion engine simultaneously passing through the device. If the catalytic device telescopes or displays separation or folding over of the leading or upstream edges of the foil leaves up to a predetermined time, e.g., 5 to 200 hours, the device is said to fail the test. Usually a device that lasts 5 hours will last 200 hours. Five hours is equivalent to 1.8 million cycles at 100 Hertz.

The Hot Cycling Test with exhaust flowing at 800 to 1100 degrees C.; 1472 to 2012 degrees F.) and cycled to 120 to 150 degrees C. once every 15 to 20 minutes, for 300 hours. Telescoping or separation of the leading edges of the thin metal foil strips is considered a failure.

The Hot Shake Test and the Hot Cycling Test are hereinafter called "Hot Tests" and have proved very difficult to survive. Many efforts to provide a successful device have been either too costly or ineffective for a variety of reasons.

The structures of the present invention will survive these Hot Tests.

Early embodiments of electrically heatable catalytic converters were relatively large, especially in an axial direction, e.g., 7 to 10 or more inches long and up to 4.5 inches in diameter. These were inserted into an exhaust system either as a replacement for the conventional catalytic converter now in common use, or in tandem relation with such conventional catalytic converter in the exhaust line. It was then found that an axially relatively thin, or "pancake" electrically heated corrugated thin metal honeycomb monolith could be used in close tandem relation with the conventional catalytic converter.

It was later found that even better performance resulted from a "cascade" of converters, i.e., a low thermal inertial electrically heatable converter (EHC), followed by a medium thermal inertia converter, followed by a large thermal inertia main converter, all on generally the same axis of gas flow. Each converter had not only a different thermal inertia, but also a different geomtetrical cross-sectional area, or a different geometrical configuration, e.g., small circular, larger oval, to the final oval size and shape of a conventional unheated converter. This solution provided for fast, economical heating of the EHC. Heat generated from an oxidation reaction initiated in the EHC then heated the intermediate converter which in turn heated the large converter.

It should be noted that the electrically heatable honeycomb acts to preheat the exhaust gas to its "light-off" temperature where, in the presence of catalysts the pollutants are converted. Some conversion occurs in the electrically heatable device, and most of the conversion occurs in the final catalytic converter section which is normally not electrically heated.

It has been found that a "pancake" electrically heatable device and a conventional multicellular metal monolith catalytic converter may be positioned together within a common housing to take advantage of the common diameter and or geometric configuration (e.g., circular, oval or elliptical) in a cascading device, and having a shorter axial length than required in either the tandem relation or the prior cascade relation. These devices provide three units of differing thermal inertia. However, instead of a three structural member cascade device, the improved structure enabled a two member cascade device. Reference may be had to the copending, commonly owned, patent application of William A Whittenberger and Edward T. Woodruff entitled "Core Element Useful in a Combined Electrically Heatable and Light-Off Converter" filed 3 Feb. 1993 and given Ser. No. 08/013,516 which shows such a device. A still further advantage of the improved "cascade" device is that it facilitates manufacture from thin metal strips to form both the electrically heatable portion and the conventional metal monolith portion, or "light-off" portion, for encasing in a single housing. The devices of the present invention include improvements on the foregoing "cascade" devices. The dual purpose devices hereof may be backed up with a conventional catalytic converter of, for example, the commonly used ceramic type, the alumina pellet type, or the metal monolith honeycomb type mentioned above. Thus, the advantages of the cascade effect for successive or staged light-off may be utilized without encountering a number of the problems associated therewith. Avoiding substantial electrical heating of a major portion of the thin metal honeycomb effects a major saving in electrical power required. As will become evident in the present structures, even further reduction in power requirements can be effected. The even smaller thermal mass of the hybrid "pancake" EHC portion of the present devices and the resulting exotherm further heat the exhaust gas and the subsequent "light-off" converter to effect substantial completion of the oxidation of pollutant materials in the presence of a catalytic agent or agents. The devices hereof may be thought of as "integral" in that at least some, but not all, of the thin sheet metal layers extend the entire axial length of the converter body, and the remainder are split or or at least partially divided into an electrically heatable portion and an unheated portion to make up the axial length of the converter body. Unlike the improved cascade devices described in the aforesaid application Ser. No. 08/013,516 wherein the electrically heatable "pancake" portion is physically separated from the "light-off" portion, those thin sheet metal layers or strips that are split, or at least partially electrically isolated, in the devices hereof, are nevertheless in contiguous relation with adjacent fully axially extending thin metal layers or strips.

The cross-section of the devices hereof may be polygonal, e.g., rectangular, circular, oval, or elliptical, and the electrically heatable portion may be fully electrically heatable, selectively electrically heatable, or partially electrically heatable.

In the following description, reference will be made to "ferritic" stainless steel. A suitable ferritic stainless steel for use particularly in the engine exhaust applications hereof, is described in U.S. Pat. No. 4,414,023 dated 8 Nov. 1983 to Aggen. A specific ferritic stainless steel alloy useful herein contains 20% chromium, 5% aluminum, and from 0.02% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV." Another metal alloy especially useful herein is identified as Haynes 214 alloy which is commercially available. This alloy and other useful nickeliferous alloys are described in U.S. Pat. No. 4,671,931 dated 9 Jun. 1987 to Herchenroeder et al. These alloys are characterized by high resistance to oxidation. A specific example contains 75% nickel, 16% chromium, 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steels and the Haynes alloys 214 and 230 are examples of high temperature resistive, oxidation resistant (or corrosion resistant) metal alloys that are suitable for use in making this metal strips for use in the converter bodies hereof, and particularly for making heater strips for the EHC portions and "light-off" portions hereof. A suitable metal must be able to withstand "high" temperatures of 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, there alloys are used as "thin" metal strips, that is, having a thickness of from about 0.001" to about 0.005", and preferably from 0.0015" to about 0.003".

In the following description, reference will also be made to fibrous ceramic mat, woven ceramic tape, or fabrics, or insulation. Reference may be had to U.S. Pat. No. 3,795,524 dated 5 Mar. 1974 to Sowman, and to U.S. Pat. No. 3,916,057 dated 28 Oct. 1975 to Hatch, for formulations and manufacture of fibers useful in making tapes and mats useful herein. One such woven ceramic fiber material is currently available from 3-M under the registered trademark "NEXTEL" 312 Woven Tape and is useful for insulation of thin metal strips or groups thereof. Ceramic fiber mat is commercially available under the trademark "INTERAM" also from 3-M. For most purposes, a coating insulation layer of alumina, for example is preferred.

BRIEF STATEMENT OF THE INVENTION

Briefly state, the present invention is a metallic converter body comprising an inner sheet metal tubular housing axially divided into at least two electrically isolated portions, and a cellular metallic honeycomb contained therein. One of the electrically isolated peripheral portions is composed of two electrically isolated segments, e.g., segments of a circle, and is adapted to be attached to electrical heating means, such as a battery or an alternator. The other portion is fully peripheral and is not connected to electrical heating means. At least one portion of the cellular honeycomb desirably has a surface area ranging from about 20 to 700 square inches and may be heated by electrical means to a temperature of from about 400 degrees F. to about 900 degrees F. in a period of from about 2 to about 40 seconds. A voltage source delivering at least about 100 watts of power provides heat through a number of heater strips. The electrically heatable honeycomb body has a cell density of from about 40 to about 500 cells per square inch, a surface area of from 20 to 700 square inches, and the cells are constructed of thin sheet metal layers or strips.

A second or "light-off" portion is generally not electrically heatable, and has a higher surface area in general, ranging from about 500 to about 5000 square inches, a cell density of from about 80 cpsi to 750 cpsi, and the cells are constructed also of thin sheet metal layers or strips.

While the high temperature resistive, oxidation resistant alloys of the types mentioned above are preferred for use in automotive exhaust applications, the thin metal sheets or layers may be made of any metal which is resistant to or nonreactive in the environment in which the converter is used. The metal may be perforated or not perforated, and coated or not with, for example, a refractory metal oxide, e.g., alumina, alumina/ceria, titania, titania/ceria, zirconia stabilized ceria, ceria, titania/alumina, silica, zirconia, alumina/zirconia, or zeolites applied as one or more washcoats and calcined. A catalyst or mixture of catalysts may optionally be deposited on or along with the refractory metal oxide surface, or the metal itself may be the reaction catalyst, e.g., copper, zinc, nickel, aluminum, etc. The refractory metal oxide coatings generally have insulative properties to insulate between contiguous layers or groups of layers of thin metal. The invention will be described illustratively herein in the field of removal of pollutant materials, mainly by oxidation, from internal combustion engine exhaust gases.

As indicated above, this invention contemplates a unitary converter body unit, i.e., one having an EHC (electrically heatable converter) and a "light-off" converter together in integral or intertwined form in the same outer tubular housing. The converter bodies hereof are, as indicated, formed of sheet metal to provide a multicellular honeycomb. This is conveniently accomplished by providing alternating corrugated and flat strips as core elements. It is an important feature of the present invention that the EHC portion and the "light-off" portion are integral or tied together internally, but the two portions have different thermal inertias. In each embodiment, at least some of the flat strips, and/or at least some of the corrugated strips extend the entire axial distance of the core and are not electrically heated. Only the heater bands are electrically heatable, and there extend an axial distance less than the entire axial length. This structure improves the durability of the converter body in the Hot Tests and preserves the advantages of the "cascade" effect previously found to be desirable. The corrugated core elements desirably have a flat central portion. The corrugations are preferably straight-through and regular, that is, they have a constant amplitude and pitch and are disposed generally normal to the longitudinal marginal edges of the strips. The corrugations may be regular and straight-through albeit canted at an angle to the longitudinal marginal edges of the strips, e.g., from about 5 degrees to about 15 degrees. The flat strips may be eliminated if the pitch is variable such as described in the aforesaid patent to Bullock et al. U.S. Pat. No. 4,810,588. The flat strips may also be eliminated if the corrugations are patterned, such as herringbone, or chevron. The latter structures result in higher back pressures which are undesirable in, for example, automotive applications.

BRIEF DESCRIPTION OF THE DRAWINGS

The invention may be better understood by having reference to the annexed drawings showing preferred embodiments of the invention, and wherein.

DETAILED DESCRIPTION OF THE INVENTION

Figure 1:
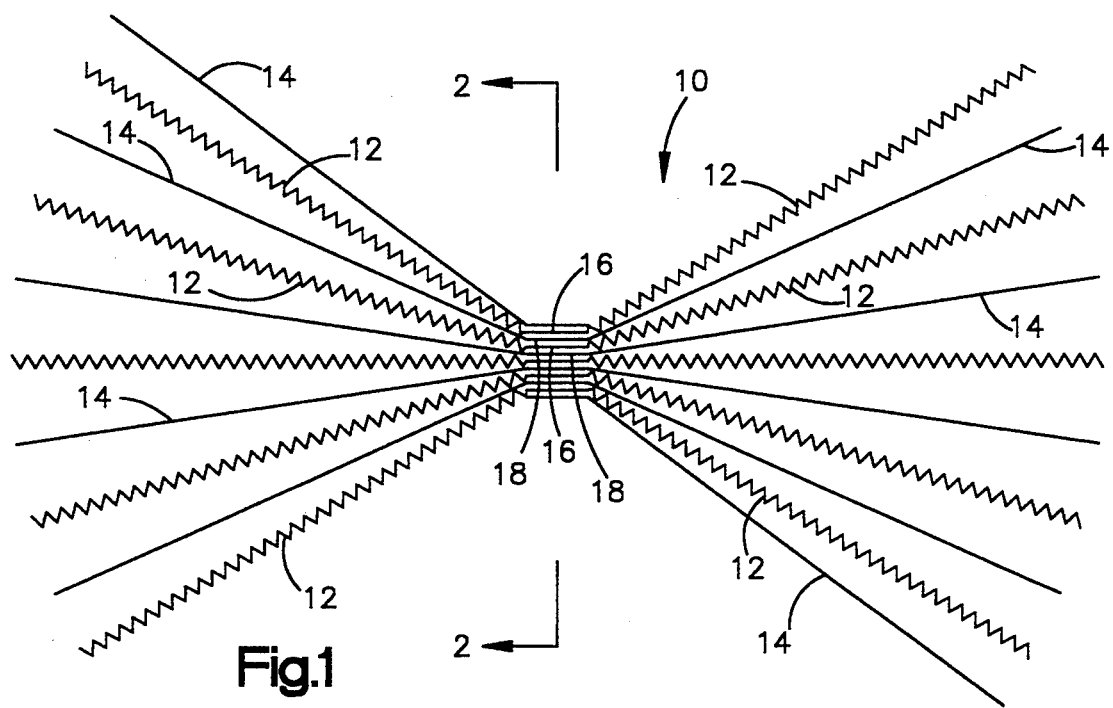
FIG. 1 is an end view of a plurality of corrugated strips and a plurality of flat strips in alternating relation gathered at their central portions and may be connected together by a fused metal prior to winding for insertion into a tubular housing.

As indicated above, the present invention contemplates a converter body, especially an electrically heatable converter body, and more specifically an electrically heatable catalytic converter body characterized by two portions, i.e., an electrically heatable portion and a "light-off" portion. The electrically heatable portion and the "light-off" portions have different thermal inertias, the thermal inertia of the electrically heatable portion being substantially less than that of the "light-off" portion by reason of its smaller axial dimension. Both portions of the converters hereof are preferably contained in the same housing. The specific devices hereof are especially useful in exhaust systems from engines utilizing generally carbonaceous fossil fuels, e.g., hydrocarbon fuels derived from petroleum.

One process for making the corrugated thin metal strips suitable for use herein is disclosed in U.S. Pat. No. 4,711,009, supra. A particular advantage of the process therein disclosed for corrugating and coating thin metal strips is that the strips may be coated, prior to cutting to length and further assembly, with a refractory metal oxide coating, e.g., alumina, gamma-alumina, gamma-alumina/ceria, vanadia, titania/vanadia, titania, titania/ceria, silica, titania/alumina, zirconia, etc, or an adsorption/desorption coating, e.g., a zeolite coating, and with a noble metal catalyst as described in that patent. This process may also be used for coating the flat thin metal strips by omitting the corrugation step. Other steps may be omitted, e.g., accordion folding, where, for example, the strips are to be precut to a given length, and further treated or handled before assembly. Alternatively, the converter bodies hereof may be fully assembled in the uncoated state, and the coatings of refractory metal oxide and noble metal catalyst applied after assembly by, for example, a dipping and calcining process. Also, the refractory metal oxide coating may be applied in a process such as described in the aforesaid U.S. Pat. No. 4,711,009, and the catalyst after-applied by a dipping process and a calcining process.

In coating the thin metal strips used herein, a number of different coating systems may be used. The coatings may be applied during processing as disclosed, for example, in the aforesaid U.S. Pat. No. 4,711,009. Alternatively, the coatings may be after-applied by dipping the finished converter body into the wash coating slurry followed by drying and then calcining, although this procedure is not recommended in the case of a "dielectric" coating described below. The catalyst coating may also be after-applied by dipping and heating to decompose the catalyst metal containing compound to the metal. Still further, the refractory metal oxide coating may be machine applied prior to assembly of the converter body, and the catalyst applied by dipping after construction of the converter body. Usually, in such a case, the coatings on all of the strips are the same, and the catalysts applied during such processing are also the same on all strips. It has now been found that the tine metal strips in a given embodiment may have different coatings and/or different catalysts. As will be seen below, the thin metal strips are layered, usually with a corrugated thin metal strip placed in contiguous relation with a flat thin metal strip. Each of these strips may have a different base coating, and/or a different catalyst. For example, the corrugated thin metal strips may have a washcoat applied refractory metal oxide coating such as, alumina/ceria, and the flat thin metal strips a zeolite coating. Or, the corrugated thin metal strips may have an alumina/ceria coating and the flat thin metal strips, a titania/ceria coating. In like manner, the corrugated thin metal strips may have an alumina/ceria coating with a platinum/rhodium catalyst, and the flat thin metal strips an alumina/ceria coating with a palladium/-rhodium catalyst. Also, alternate corrugated thin metal strips may have different refractory metal oxide coatings and/or different catalyst combinations. Still further, the coating on the same thin metal strip may be different as well as the catalyst. For example, with a corrugated thin metal strip, one side may be coated with one refractory metal oxide material, and the other side with a different refractory metal oxide material. Likewise, the catalyst used on a given strip coating with the same or different refractory metal oxides on opposite sides, may be different, e.g., platinum on one side and rhodium on the other side. Generally, in each channel or cell, the gas undergoing chemical reaction is exposed to both coatings. However, the cell or channel may be constructed in such a way that the gas is exposed to one coating in each channel or cell, by putting like coatings back-to-back. Other combinations include an adsorbant, such as a zeolite, on one surface and a heavy metal or precious metal catalyst on the other side of the same thin metal strip or different thin metal strips in back-to-back relation. At low temperatures, the zeolite adsorbs hydrocarbon, for example. At medium temperatures, the catalyst would promote light-off of the carbon monoxide present, for example. Heat from the oxidation reaction would be conducted through or radiated to the differently coated strip or side, cause the zeolite to drive off the hydrocarbons which would then oxidize on the surface containing the precious metal catalyst before the gas left the channel or cell. In a system where one strip is coated on both sides with a given adsorbant, e.g., a zeolite, and a contiguous, electrically heated (at a low or modest power level), thin metal strip coated on both sides with a given noble metal catalyst, the catalyst reaches light-off temperature before desorption takes place. When the hydrocarbon does desorb, it is converted to carbon dioxide and water by the heated catalyst.

A typical procedure for applying a "dielectric" coating involves first coating the thin metal strip, whether flat or corrugated, and formed of an aluminum-containing, high temperature resistive, oxidation or corrosion resistant alloy, with a single coat of gamma-alumina at a loading of about 5 mgs per square inch of surface, followed by drying and then calcining at 700 to 1200 degrees C. (1292 to 2192 degrees F.) for at least about 10 seconds, to form a tightly bonded insulative coating. This is typically followed by coating again with 1 to 6 or more washcoatings of gamma-alumina/ceria mixture to a loading of about 30 to 40 mgs. per square inch, drying after each coat, and then calcining at about 500 degrees C. (930 degrees F.). The usual coating with a refractory metal oxide produced at the lower temperature of 500 to 1200 degrees F. also has insulating properties but not to the same degree as the "dielectric" coating. The "dielectric" coating as here described is believed to be a spinel and thus is chemically different from the normal refractory metal oxide coating calcined at the lower temperature. The "dielectric" coated core elements are usually only the heater strips 14a.

One can also form a suitable coating on Haynes 214, for example, by heating the strip in an oven at 1000-1200 degrees C. for from 10 to 300 minutes and growing a tight chromium-aluminum oxide layer on the surface.

Thus, numerous combinations may be made to meet various situations of gas composition, gas temperature, gas pressure, etc.

Figure 3:
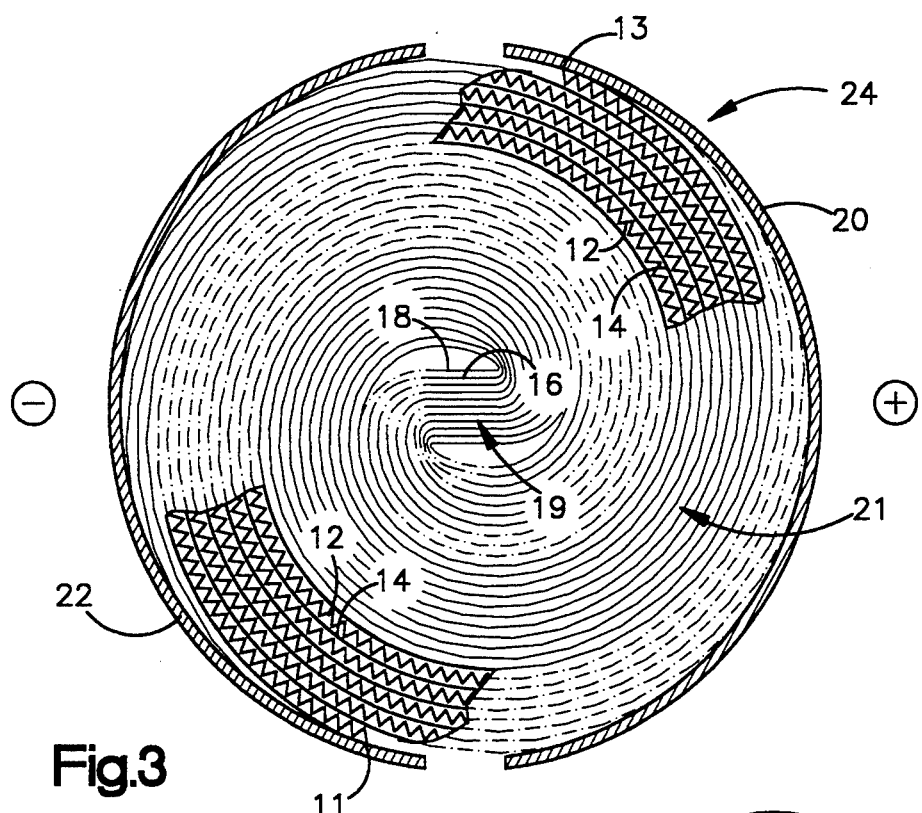
FIG. 3 is an end view of a converter body showing a group of alternating corrugated and flat strips co-wound into a tight assembly and contained within a split tubular sheet metal housing.

Referring now more particularly to FIG. 1, there is here shown a group or stack of thin metal strips generally indicated at 10 composed of corrugated thin metal strips 12 and flat metal strips 14 in alternating relation. It should be noted that in the embodiment shown in FIG. 1, flat strips 14 are at the top and bottom of the stack 10. Individual strips, especially when used in an engine exhaust application, must be of a high temperature resistive, oxidation resistant alloy. The corrugated thin metal strips 12 each have a flattened central portion 16, and each of the flat metal strips 14 have a flat central portion 18. The group or stack 10 is gathered at the flat central portions 16 and 18 and connected together by mechanical means, e.g., stapling or riveting, or by means of a bifurcated pin, or by a fused metal, e.g., by welding or by a fused brazing metal, the latter being preferred. The flat central portions of the layered strips 12 and 14 are desirably about 3/16" to 1" wide. A suitable brazing paste may be applied in this area to enable bonding of the layers together. The layers 12 and 14 are desirably crushed together and current applied through the crushing jaws to braze or spot weld all the layers together in the central area. This fuses the stack 10 in the center without the necessity for using a pin or rod. Other means of joining the stack 10 at the central areas 16 and 18 may be used, e.g., a metal staple, a rivet, or a metal U-clip or an encircling band. If the thin metal strips 12 and 14 are coated with one or more layers of refractory metal oxide, e.g., 75% gamma alumina/25% ceria, prior to joining the several layers, this coating in the central portions 16 and 18 should be removed as by grit blasting or rotary wire brushing. Otherwise, the bonding of a fused metal between the layers is generally less than satisfactory. The free ends of the respective strips 12 and 14 should also be stripped of refractory metal oxide coating to enable their attachment to the electrically isolated segments of the tubular housing as discussed below. The heater strips are normally partially coated with a "dielectric" coating as described above, and thus cannot conveniently be welded together, and mechanical means such as mentioned above may be used. The ends for about ⅛" are left uncoated so that the heater bands can be brazed or welded to the electrical conductors as described below. As shown in FIG. 1, the individual strips 12 and 14 are continuous from one free end through the respective central portions 16 and 18 to the opposite free end. The group of layered sheet metal strips of FIG. 1 is shown in expanded uncoiled relation, and is gripped at the central portion with suitable legs or jaws, such as the legs of a bifurcated pin (not shown) and rotated in a clockwise manner, for example, until the strips 12 and 14 are tightly wound in a spiraliform manner, or into an S-shape, one side in a counterclockwise spiral and the other in a clockwise spiral. The strips 12 and 14 are thus brought into contiguous relation. After winding, the legs or jaws (or bifurcated pin) are removed. If the strips 12 and 14 are of uniform length and the flat portions centrally located, the resulting configuration will be circular. If the strips 12 and 14 are of different lengths, and/or the flattened portions displaced from the center of the strip length, then any oval or elliptical shape may be achieved as will be understood by those skilled in the art. The heater strips may also be made longer than the corrugated strips, for example, for easier attachment to the electrical conducting segments 20 and 22 (FIG. 3). They may also be folded one or more times in an S-shape or sinuous manner to increase resistance, and the free ends thereof attached to the electrically isolated segments. Attachment may be by welding the ends to the segments, or by wires leading from the strips to the respective segments.

The corrugations of strips 12 provide, with the flat strips 14 and the flat bands 14a–14b, (FIG. 2), preferably straight-through cells extending normal to the longitudinal marginal edges of the strips 12, or parallel to the central axis of the finished core body. The straight-through cells may also be oblique to the longitudinal marginal edges of the strips 12.

Figure 2:
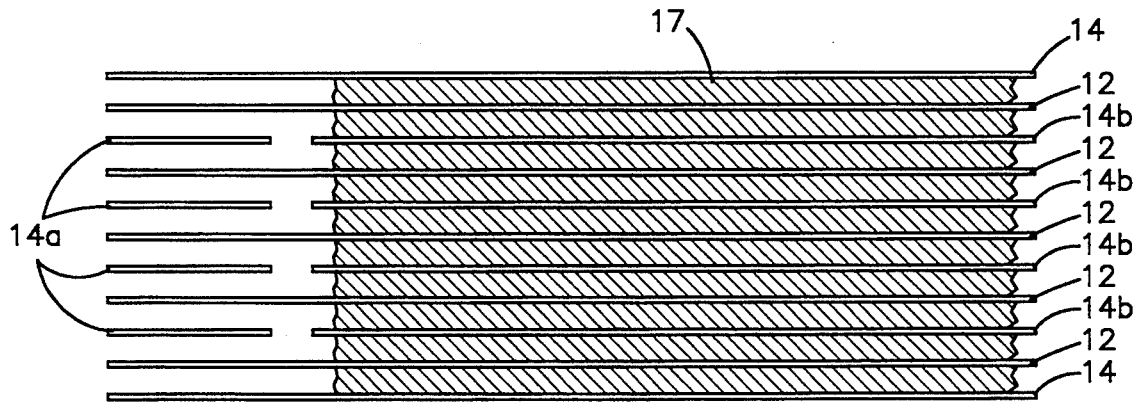
FIG. 2 is a cross-sectional view on an enlarged scale of the structure shown in FIG. 1 as it appears in the plane indicated by the line 2—2 in the brazed portion.
Figure 5:
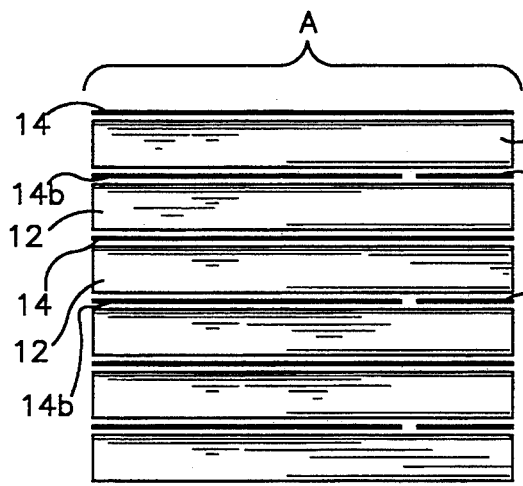
FIG. 5 is a diagrammatic illustration of the layered longitudinal edges of a series of strips, corrugated and flat, showing an arrangement wherein full axial length flat strips are alternated with flat strips split into two portions, one of which portions is relatively narrow and heatable (with corrugated strips between all flat strips) to provide an EHC portion of reduced thermal inertia and quicker heating. The direction of gas flow is shown by the arrow. This view is upstream of the brazed section shown in FIG. 2.

FIG. 2 shows a section through the brazed central portion of FIG. 1 as it appears in the plane indicated by the line 2—2. Note that as shown in FIG. 2, no brazing material is present in the EHC area, brazing being desirably limited to the "light-off" area only. It will be observed that the strips 12 which prior to crushing were corrugated and the strips 14, and the bands 14a and 14b, are flat with a previously corrugated strip 12 between every flat strip 14 and the flat bands 14a–14b. As shown in FIG. 5, alternates of the flat strips 14 are divided into two band portions 14a and 14b, portions 14a being heater bands 14a which are connected to a voltage source (not shown) to provide means for heating the EHC portion. The remaining portions bands 14b are in the axially downstream "light-off" portion of the converter body, are non-electrically heated, and the alternate flat strips serve to keep the corrugated strips 12 from nesting into one another. The electrically heatable narrow bands 14a are coated with a "dielectric" coating described above except at the ends which may be suitably masked so as to remain uncoated for brazing to the electrically conducting segments 20 and 22. The flat strips 14 which extend the entire axial length of the converter body are coated with a refractory metal oxide, e.g., an alumina coating which is not removed on the ends which extend into the EHC portion. Hence, these ends are not attached to the segments 20 and 22 and do not, therefore, conduct current or power from the voltage source to the full axial length thin metal strips 12 and 14. Thus, it will be seen that preferred embodiments of the converter bodies hereof combine the EHC and "light-off" portions in such a way that they are virtually integral. The EHC portion is electrically heatable whereas the "light-off" portion is not.

Another type of coating may be formed by heating an alloy containing chromium and aluminum (e.g., Haynes 214) in an oven at 1000 to 1200 degrees C. for 10 to 300 minutes to provide a tight Cr-Aluminum oxide coating on the surface. For insulation redundancy, all strips, corrugated and flat, may be refractory metal oxide coated in both the EHC portion and in the "light-off" portion.

The heater bands 14a are desirably coated on both sides with the "dielectric" coating described above. The flat bands and the remaining corrugated and flat thin metal strips are desirably coated with either the "dielectric" coating or a refractory metal oxide, e.g., a gamma-alumina coating applied as a washcoat.

Figure 2A:
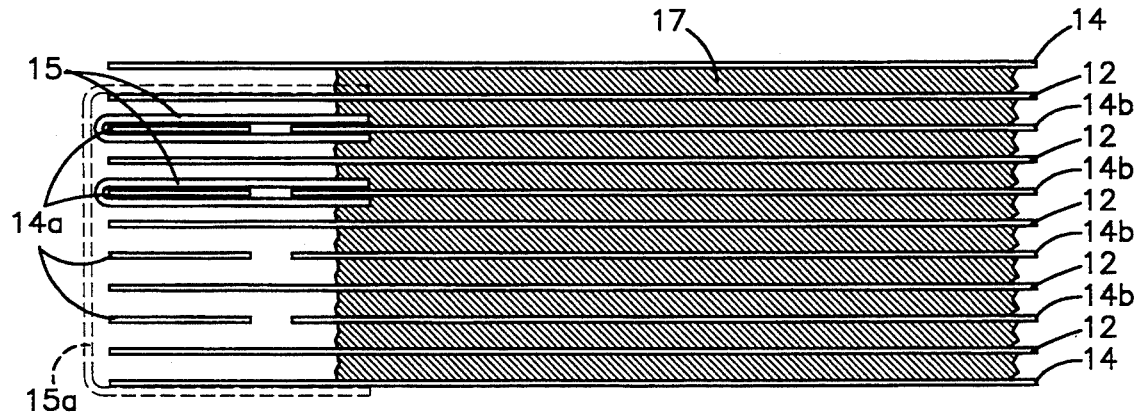
FIG. 2A is like FIG. 2 and shows additionally assembly aid clips for retaining the heater bands against unwanted movement during assembly.

FIG. 2a shows an assembly aid for better retaining the heater bands 14a in place. The assembly aids comprise narrow, e.g., ½" or less, U-shaped clips 15 formed of preferably uncoated thin high temperature resistive, oxidation resistant metal that embrace the edge of the heater band 14a, or the edges of a group of heater bands 14a, (as shown by the clip 15a shown in dotted line) at the closed end of the U-clip 15. The free legs of the U-clip 15 extend into the brazed section 17 of FIG. 2 and thus retain the heater bands 14a against unwanted movement.

FIG. 3 shows an end view of a converter body hereof formed by grasping and rotating the secured central portions in a clockwise manner. The central portions 16 and 18 when brazed together, for example, form a central stem or rigid body generally indicated at 19 which extends the entire axial length of the converter body. The stem 19 is discontinuous in the EHC portion because of the presence of the insulative coating on the heater bands 14a. The entire structure has sufficient strength to withstand the rigors of the Hot Tests. This brazed feature eliminates the need for a central pin, e.g. central pin and the retaining bar as described in the aforesaid application Ser. No. 08/013,516 filed 3 Feb. 1993, now abandoned. The outer ends of the foil heater bands 14a are dimensioned and configured, and, if necessary, cleaned of any coating, to enable attachment by means of a fused metal joint to the electrically isolated tubular housing segments 20 and 22 as by brazing. This may be accomplished conveniently by wrapping the bundle of tightly wound thin metal strips 12 and 14 forming the core body 21 into a thin axially co-extensive layer, or axially spaced narrow layers, of brazing metal foil, inserting the stack in the housing segments 20 and 22, and inductively heating the assembly to fuse the brazing metal. The housing segments 20 and 22 are conveniently made of #433 stainless steel 0.020" to 0.060" thick. A suitable brazing metal foil is commercially available. The points 11 and 13 indicate where the flat strip 14 and the corrugated strip 12 is secured to the housing 22.

Figure 4:
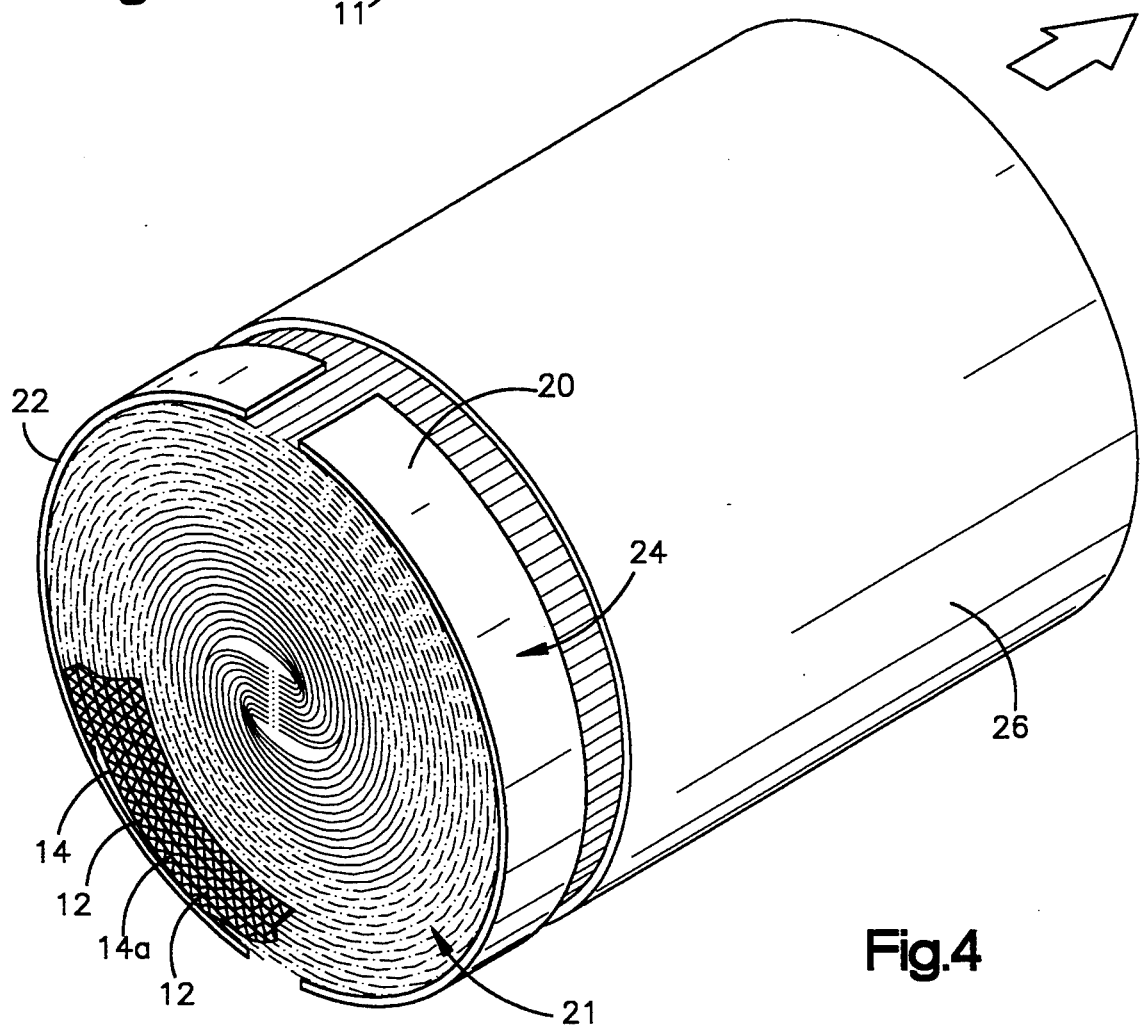
FIG. 4 is an isometric perspective view of a core body of the present invention showing a segmented retaining shell in the EHC portion, and a fully tubular shell in the light-off portion.

FIG. 4 shows in perspective a front view of a converter body in accordance with this invention, and better shows the dual nature of the electrically heatable devices hereof. The front portion 24 is defined by an S-wound core body 21 retained in a pair of arcuate members 22 and 20 which are the electrically isolated segments 20 and 22 of FIG. 3. In this front portion 24 are shown the upstream ends of the electrically heatable flat heater bands 14a, the upstream ends of the flat strips 14 and the upstream ends of the corrugated strips 12. In regard only to the flat strips, alternate flat strips 14 extend the entire axial length of the converter body of FIG. 4 whereas the heatable flat heater bands 14a, which are in alternating relation with the flat strips 14, extend only a relatively short axial distance, e.g., 0.25" to 2", from the gas inlet end into the converter body. The remaining portions 14b of the flat bands 14a–14b extend the remaining axial distance of the converter body of FIG. 4. The flat band portions or heater bands 14a are spaced from and out of electrical contact with the remaining portions 14b, the axial spacing distance being from about 0.05" to about 0.25", e.g., 0.075". Instead of every other flat strip 14a–14b being split as in the preferred embodiment shown, for example, in the diagrammatic drawing FIG. 5 described below, every third or every fourth flat strip may be divided and the divided portions corresponding to portions 14a connected to the encircling retainer segments 20 and 22 so as to be electrically heatable. It will be seen, therefore, that EHC portion and the "light-off" portion of the converter bodies of the present invention are integral or intertwined because, for example, the several corrugated strips 12 may extend the entire axial length of the converter body, while the heater bands 14a in the EHC portion extend only a relatively short axial distance and are separated or electrically isolated from the balance of the flat strip 14a–14 b.

The thin metal strips 12, 14 and 14b that extend into and through the "light-off" portion of the converter bodies hereof are attached to the inside of the housing member 26 FIG. 4, by cleaning the ends of strips 12, 14, and 14b of any refractory metal oxide coating, wrapping the bundle of spirally or S-wound thin metal strips with a thin sheet of brazing metal foil, such as that available from Allied Metglas in Parsippany, N.J., placing the wrapped bundle into a suitable housing 26, and inductively heating the assembly until fusion of the brazing metal takes place. Because no electrical power is supplied to the housing 26, the thin metal strips 12, 14, and 14b in the "light-off" portion are not electrically heated.

The devices hereof are desirably made without end tabs on the ends of the thin metal strips, or, some of the thin metal strips, e.g., the heater bands 14a may have end tabs, and the other corrugated and the other flat strips may be secured by a fused metal, e.g., brazing, to a retaining housing. End tabs are disclosed in commonly owned copending application Ser. No. 08/013,516.

Figure 6:
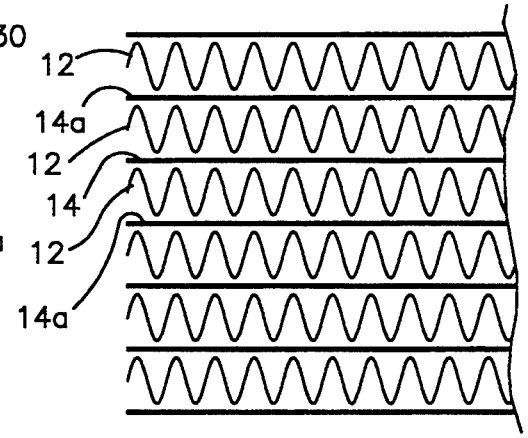
FIG. 6 is a diagrammatic illustration of the upstream ends of the layered strips as shown in FIG. 5.

FIG. 5 shows in diagrammatic form an arrangement of sheet metal layers of corrugated and flat strips having parallel longitudinally extending marginal edges in a combined EHC and "light-off" converter. Here, instead of every flat strip having a separated heater band as shown in the aforesaid application Ser. No. 08/013,516, only every other flat strip has a separate heater band. Thus, there is shown in FIGS. 5 and 6 a first thin metal flat strip 14 extending over the entire axial length A of the converter body 30 in contiguous relation with a corrugated thin metal strip 12 also extending over the entire axial length A of the converter body 30. The next flat thin metal strip is in the form of two electrically isolated bands 14a and 14b both of which are in contiguous relation with the corrugated thin metal strip 12 on either side thereof. The heater bands 14a are all connected at one end to a retainer housing segment, e.g., segment 20 as best shown in FIGS. 3 and 4, and connected at the other end to another retainer housing segment, e.g., segment 22 also shown in FIG. 3. The heater bands 14a are broadly from about 0.2" wide to about 1.5", e.g. 0.6" wide, and from 0.001 to about 0.003" thick, e.g., 0.0016" thick. The flat bands 14b have a length broadly from about 3.5" to about 14" long, e.g., 6.5" long. The flat bands 14b are broadly from about 2.0" to about 6.0" wide (in an axial direction of the final core body), e.g., 3.25" wide, of the same or different thickness as the heater bands 14a. The bands 14b are not electrically heated. The corrugated strips 12 have essentially the same overall dimensions as the flat strips 14. The corrugations are generally triangular with the apices rounded to relieve stress. The corrugations generally have an amplitude of from 0.02" to about 0.3", e.g., 0.055", and a pitch of from about 0.05" to about 0.3", e.g., 0.15". The corrugations are conveniently made by passing a continuous thin metal flat strip between forming gears as described, for example, in the aforesaid U.S. Pat. No. 4,711,009. Refractory metal oxide coating and noble metal catalyst may desirably be applied as described also in said U.S. Patent. The cell density, or number of cells per square inch, (cpsi), is generally in the range of from about 40 to about 500 cpsi, e.g., 180 cpsi. The surface area of the electrically heatable portion of FIGS. 5 and 6 is preferably from 20 to 700 square inches. The EHC honeycomb is electrically heatable to a temperature of from 400 degrees F. to 900 degrees F., e.g., 650 degrees F., in a period of from 2 to 40 seconds.

FIGS. 5 and 6 again illustrate the integral nature of the EHC and "light-off" portion of the converter bodies hereof. The different thermal inertias of the two portions is, nevertheless, preserved.

Figure 7:
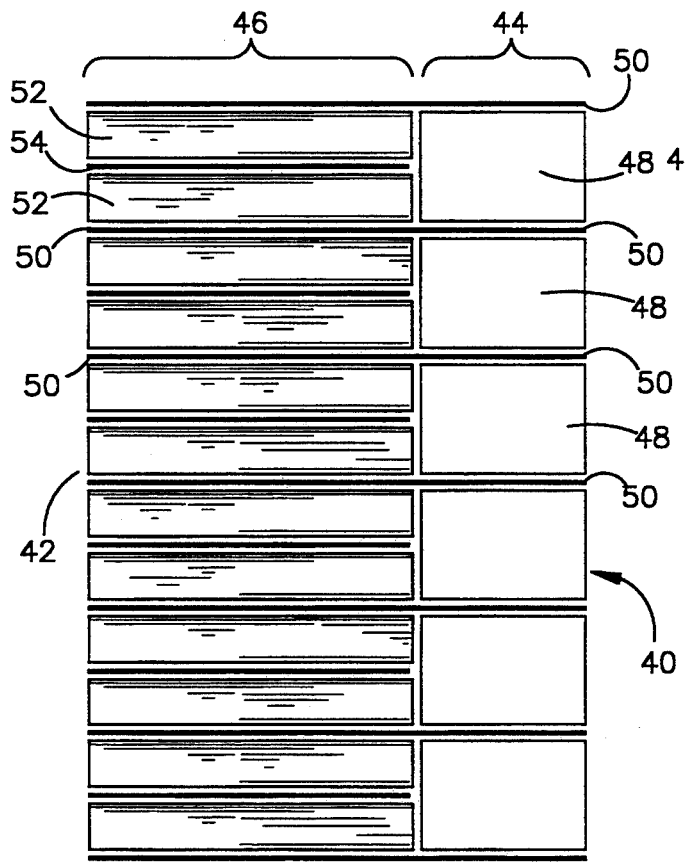
FIG. 7 is a diagrammatic illustration of another arrangement of layered corrugated and flat strips showing a heatable portion made up of corrugated thin metal heater strips having an amplitude twice that of the corrugated strips in the "light-off" portion, and all corrugated strips in alternating relation with flat strips. The direction of gas flow is shown by the arrow.
Figure 8:
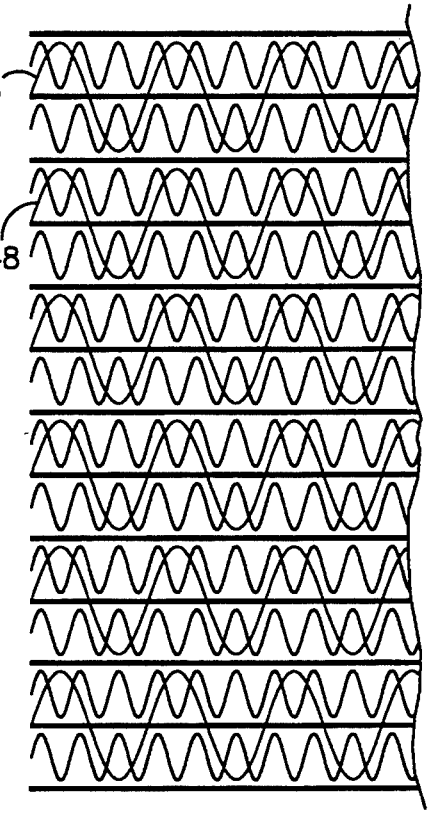
FIG. 8 is a diagrammatic illustration of the upstream ends of the layered strips as shown in FIG. 7

FIGS. 7 and 8 are diagrammatic views like FIGS. 5 and 6 showing another embodiment of the present invention in which the heater bands are corrugated instead of flat. Here, the amplitude of the corrugations in the heater bands is significantly larger than that of the corrugations in the balance of the converter, e.g., from about 2 to about 4 or more times the amplitude. Thus, FIG. 7 is a diagrammatic view of the layering of the thin metal strips in an axial direction, the arrow showing the direction of gas flow from the upstream end 40 to the downstream end 42. FIG. 8 is a diagrammatic end view of the structure shown in FIG. 7 from the upstream end 40 showing the layering of the thin metal strips.

Referring now to FIG. 7, there is shown a heater zone 44 and a "light-off" zone 46. Each zone 44 and 46 is constructed of alternating corrugated and flat strips in contiguous relation. Heater zone 44 is made up of high amplitude corrugated thin metal bands 48, and flat thin metal strips 50, the latter strips 50 being coextensive with the axial length of the converter body. The "light-off" zone 46 is made up of lower amplitude corrugated thin metal bands 52 in contiguous alternating relation with the full axial length flat thin metal strips 50 and the shorter flat thin metal bands 54 in the "light-off" zone 46. The corrugated thin metal bands 52 and the flat thin metal bands 54 have the same axial length. By "high" amplitude corrugated thin metal strips, is meant strips having an amplitude of from 2 to 4 or more times the so called "low" amplitude of the corrugations in the "light-off" zone. For example, the amplitude of the corrugated thin metal heater bands 48 may be from about 0.06" to about 0.3", e.g., 0.11" and the pitch from about 0.1 to about 0.4", e.g., 0.25". With the exemplary dimensions, the cell density in the heater zone 44 is about 72 cpsi. The heater bands 48 are broadly from about 0.25" to about 2" wide, e.g., 0.75" wide. The corrugated heater bands 48 are mechanically supported on their axially inner edges on the confronting edges of two or more corrugated layers 52 and a flat layer 54 as viewed to the rear, or in a downstream direction in FIG. 7.

In FIG. 7 all the heater bands 48 are heated electrically. Rather than every heater band, e.g., heater bands 48, whether flat or corrugated, being heated, every other heater band, or every third heater band is electrified, and thus heatable. The nonelectrified bands are made full axial width. This expedient reduces the heated surface area while maintaining the geometry of the converter constant, and it allows lower resistance units to be constructed without series circuits.

In the "light-off" zone 46 of FIGS. 7 and 8, the corrugated thin metal strips 52 have a "low" amplitude of from about ¼ to about ½ of the "high" amplitude thin metal strips 48, e.g. ½ or in the specific example, 0.055". The pitch is generally about ½ that of the "high" amplitude corrugation, in the specific example, 0.15",to give a cell density in the "light-off" zone 46 of about 250 cpsi. The narrow flat bands 54 in the "light-off" zone 46 are desirably of a width which is the difference between the width of the heater bands 48 and the axial length of the converter body, 44 plus 46, in the specific example, 3.0". The axial length 44 plus 46 in the specific example is 3.75". Individual electric wire conductors leading from a terminal to the several heater bands may be used to feed power to the heater bands.

The thin metal strips in zones 44 and 46 may be of the same high temperature resistive, oxidation resistant metal, such as those mentioned above, and the same thickness of metal. In the specific example, the corrugated heater strips 48 are made of Haynes 230 alloy. The heater strips 48 may alternatively be made of Haynes 214 alloy. The corrugated "light-off" portion bands 52 may be made of ferritic stainless steel, e.g., Alfa-IV. The corrugated bands 52 may have the leading or upstream edge folded over for ⅜" to 1 inch prior to the corrugation step to provide reinforcement to the band to improve durability in the Hot Tests. The shorter flat bands 54 may be made of either ferritic stainless steel or Haynes 214 or Haynes 230 alloy. In a specific embodiment using thin metal foils 0.002" thick and heater band width of 1.37" with 72 cpsi in the heater zone 44 and 180 cpsi in the "light-off" zone 46, it becomes possible to attain the up to 400 square inches of area, and a power level of 22 kilojoules.

FIGS. 7 and 8 again show the integral nature of the EHC and "light-off" portions of the converter bodies hereof. The differing thermal inertias are, nevertheless, preserved, and the geometrical cross-sectional configurations of the successive cascading units are the same.

When the strips 12 and 14 and 14a–14b are layered as shown, for example in FIGS. 2 and 5, are crushed in the center as shown in FIG. 1, spirally, or S-wound as shown in FIGS. 3 and 4 and encased in a housing, the resulting converter core body is "intertwined and integral."

It should not be inferred from what has been set forth above that no part of the "light-off" portion is heated. Because of the overlapping or intertwining of the two portions of the converters hereof, there will be some heating of the "light-off" portion by conduction from the heater bands in the EHC portion to the contiguous corrugated thin metal strips, and hence also by conduction, into the "light-off" portion of the converter. A temperature gradient will thus be established bridging both portions. However, no direct application of electrical power to the "light-off" portion occurs.

As indicated above, the thin metal strips from which the devices hereof are formed may desirably be coated. When a catalyst is to be used, the thin metal strips should be coated first with at least a thin layer of refractory metal oxide, e.g., alumina/ceria or a thin layer of a "dielectric" coating. Thereafter a catalyst or mixture of catalysts is deposited onto the refractory metal oxide coating or the "dielectric" coating, as the case may be. Usually this is done from an aqueous solution of one or more water soluble catalyst metal salts, the catalyst layer dried, and then calcined or hydrogen reduced to decompose the metal salt to the noble metal catalyst. Suitable catalyst metals are, as above indicated, platinum, palladium, rhodium, ruthenium, indium, or mixtures of two or more of such metals. Suitable mixtures for use in automotive applications include platinum/palladium, platinum/rhodium, palladium/rhodium, platinum/ruthenium, palladium/ruthenium, platinum/rhodium/zeolite, platinum/palladium/rhodium, etc.

Figure 9:
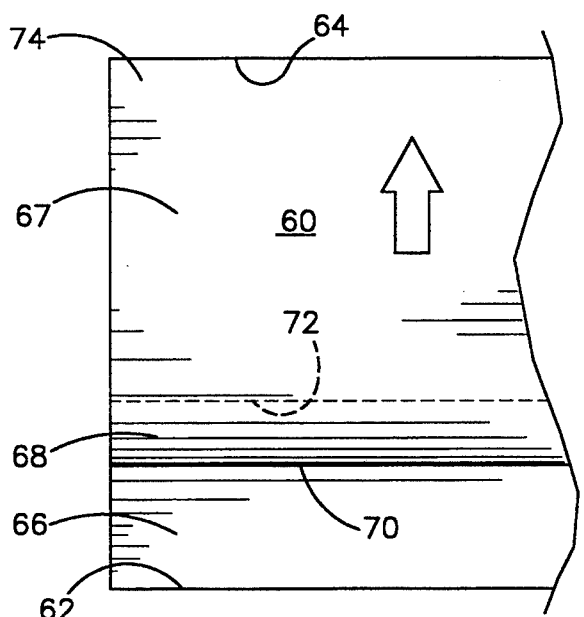
FIG. 9 is a plan view of a thin metal strip showing reinforcement by pleating the strip intermediate the opposing longitudinal marginal edges and optionally along the downstream marginal edge. The arrow shows the direction of gas flow.
Figure 10:
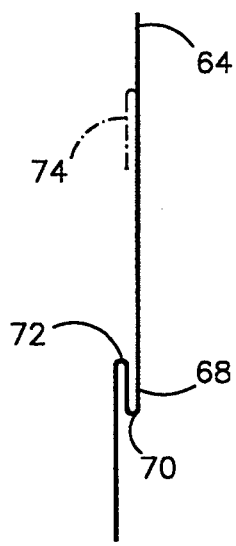
FIG. 10 shows on an enlarged scale an end view of the pleated thin metal strip of FIG. 9.

FIG. 9 shows in plan view an improved thin metal strip 60 which may be used as either the flat thin metal strip or band, or the corrugated thin metal strip or band. The arrow shows the direction of gas flow. FIG. 10 shows a strip 60 in end view. In FIG. 9, the strip 60 has a leading or upstream edge 62 and a downstream or trailing edge 64. The downstream edge 64 may optionally be overfolded to provide a double thickness edge 74 to reinforce the trailing edge 64. The upstream edge 62 is desirably at normal thickness, e.g., 0.001 to 0.003", specifically, 0.0016". Upstream edge 62 may also be reinforced by overfolding the edge 62 for a short axial distance as well. The upstream portion 66 is a heated portion, and to keep the mass as low as possible, desirably no reinforcement is provided for the upstream edge 62. Reinforcement for the strip 60 is provided by a pleat 68 located intermediate the leading edge 62 and the trailing edge 64, and formed by reverse folding the strip 60 twice for a distance of about 3/16" to ¾", e.g., ½", first along fold line 72, then again in the opposite direction along fold line 70. The width of the heater portion 66 is from about 0.25" to about 1.5", e.g., 0.75". The width of the "light-off" portion 67 is the balance of the axial length of the converter body as described above. The strip 60 is first folded and/or pleated as at 68, and then optionally folded along the fold line 64 to provide reinforced edge 74. These folds are tightly creased so that the thickness in the region of the pleat 68 is tripled, and the thickness in the region of the overfold 74 at trailing edge 64 is doubled. When the strip is to be corrugated, corrugation is done after the folds are made. Corrugation may be accomplished as described in the aforesaid U.S. Pat. No. 4,711,009.

Figure 11:
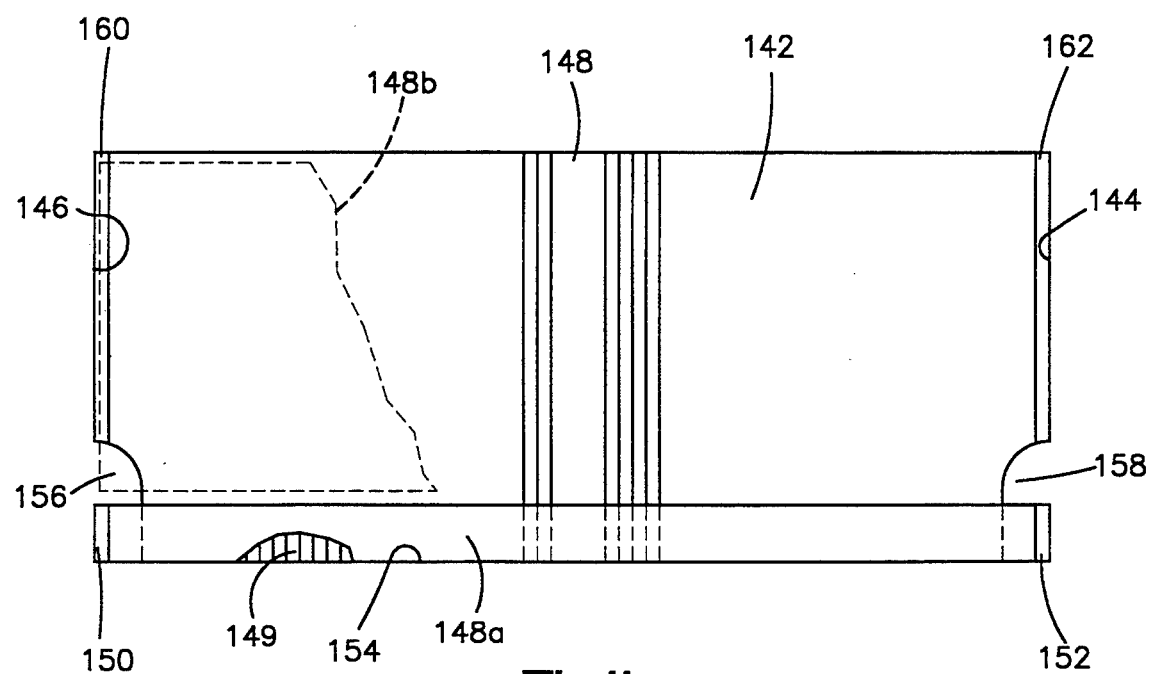
FIG. 11 shows a corrugated thin metal strip overlayed by a thin metal heater band and illustrated a preferred method for arranging full axial length unheated strips with the heater bands.

FIG. 11 shows a preferred mode for configuring a full axial length unheated thin metal strip so that it does not interfere with a heater band and its attachment to an electrically isolated segment, such as segments 20 and 22 in FIG. 3. There is shown a full axial length corrugated thin metal strip 142 in its developed state. This strip 142 is not electrically heated. The top edge 144 and the bottom edge 146 as shown in FIG. 11, will lie in the axial direction when the strip 142 is wound and put into its housing, e.g., the housing 26 in FIG. 4. The thin metal strip 142 has a flattened central portion 148 as described above in connection with FIG. 1. Overlying the corrugated thin metal strip 142 is a flat thin metal heater band 148a. As indicated above, the flat heater band 148a (corresponding to heater band 14a) is desirably coated with a "dielectric" coating which coating has been removed or screened out in the end areas 150 and 152 to expose bare metal and enable brazing or welding to the electrically isolated segments 20 and 22 (FIG. 3) respectively. Coating in the central portion of the heater bands 148a must be preserved so that electrical isolation of the heater bands 148a is maintained. The corrugated thin metal strip 142 is provided with notches 156 and 158 in the leading edge 149 of the corrugated strip 142, visible in the cut-away portion of leading edge 154 of the flat heater band 148a. The edges 160 and 162 of the corrugated strip 142 are cleaned of refractory metal oxide coating so that they can be brazed to the housing 26, FIG. 4. In FIG. 11, a flat band 148b corresponding to the flat band 14b in FIG. 5, for example, is shown, partially cut-away. Thus, provision is made for the non-electrically heated thin metal strips to be brazed to the housing 26 and for the heater bands to be brazed to the electrically isolated segments 20 and 22 (FIGS. 3 and 4) while maintaining the full pack of thin metal strips in the converter body and the mutual support offered by contiguous thin metal strips.

Figure 12:
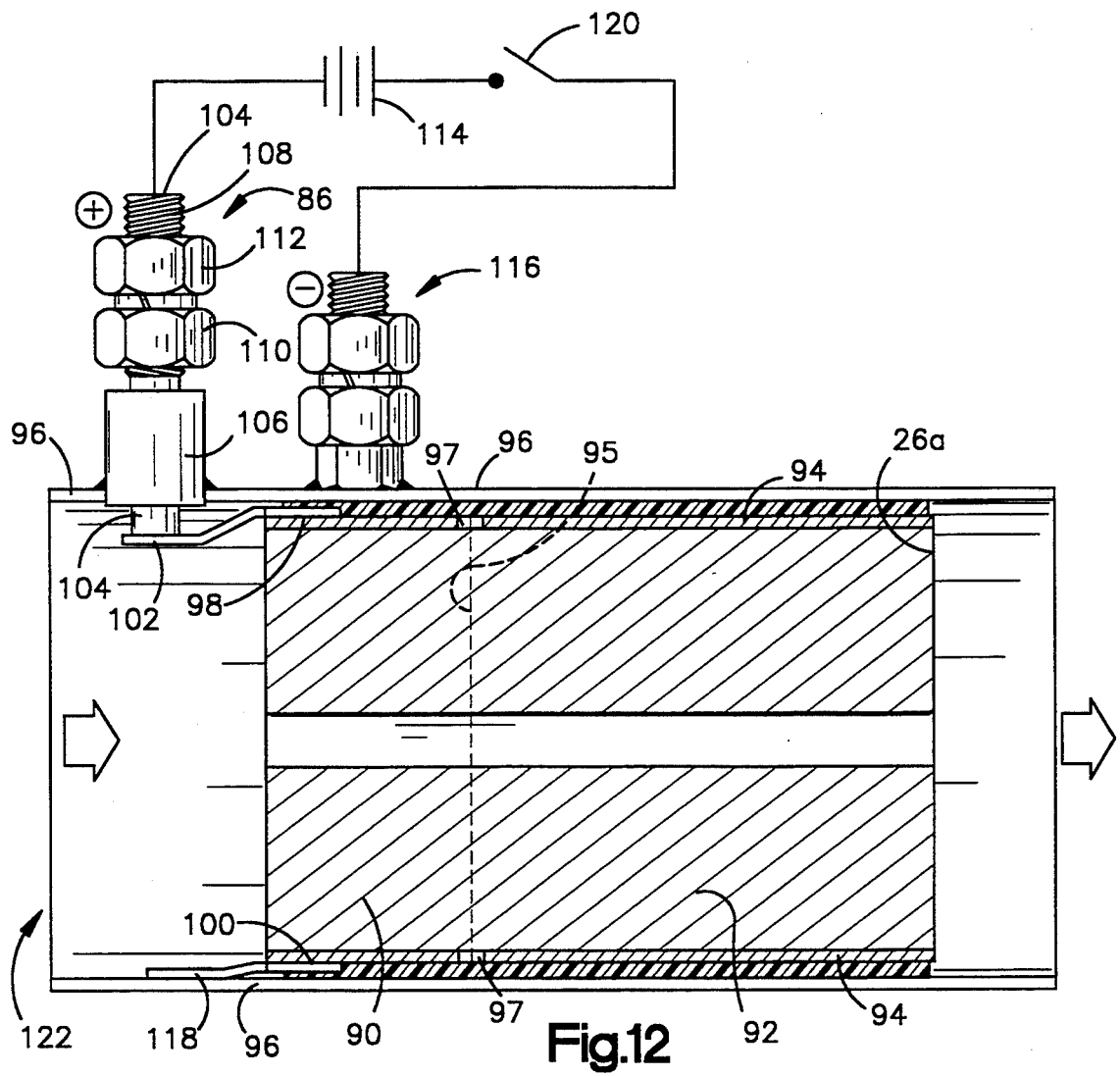
FIG. 12 shows in partially diagrammatic form a cross-sectional view of a converter utilizing a converter unit such as shown in FIGS. 1-4 in a housing and with means for attaching a voltage source to the unit to effect electrical heating thereof. The combined EHC and "light-off" portions are shown in diagrammatic or schematic form.

FIG. 12 shows in diagrammatic form a cross-section of an electrically heatable converter 122 having a heater portion 90 and a "light-off" portion 92 in the same outer housing 96. As will be appreciated from FIG. 12, the thermal inertia of the heater portion 90 is less than the thermal inertia of the "light-off" portion 92 because of its shorter axial length and/or its different structure, e.g., different cell density. The converter body shown in FIG. 12 is includes both an EHC portion and a "light-off" portion in integral relationship. The heater portion 90 is provided with its generally tubular housing formed of segments 98 and 100 which correspond to electrically isolated segments 20 and 22 in FIG. 3. The "light-off" portion 92 is contained in a 360 degree circular tubular housing 94. Because of the split thin metal sheets, e.g., sheets 14a–14b in FIGS. 2 and 5, the small distance between bands 14a and 14b, for example, 0.01" to 0.1" is indicated by the single dotted line 95. This split inhibits current loss into the "light-off" portion 92 of the device. To supply power to the EHC portion 90 of the device, the segment 98 is connected by means of a strap 102 to terminal feed-through stud 104 which is insulated from the collar 106 and the outer housing 96. The collar 106 is welded to the outer housing 96. The distal end of the stud 104 is threaded as at 108 to accept locking nuts 110 and 112 for retaining cable end (not shown) from a voltage source 114, e.g., a 12 volt automotive battery. A second terminal 116 is welded directly to the outer metallic housing 96 which is, in turn, connected by means of a strap 118 to another electrically isolated segment 100. Thus, when the switch 120 is closed, current will flow from the outer housing 96 into the lower segment 100, through the thin metal strips forming the honeycomb heater portion 90 and the upper segment 98 thereby resistance heating the heater portion 90, and through the feed-through terminal or stud 104 to the battery 114. The direction of gas flow through the converter body 122, is shown by the arrows in FIG. 12. The converter body (see FIG. 4) may be completely isolated from the outer case or housing 96 by using a separate feed-through like the feed-through 86, for example, for the negative pole.

There has thus been provided an improved converter body, especially an electrically heatable converter body portion characterized by a cellular honeycomb monolith. The EHC portion monolith has a surface area of from 20 to 700 square inches in the electrically heatable portion, and from 500 to 5000 square inches in the "light-off" portion. The EHC honeycomb is capable of being rapidly heated to a temperature of from 400 degrees F. to 900 degrees F. in a period of from about 2 to about 40 seconds from a 12 volt voltage source delivering at least about 500 watts of power. The overall honeycomb has a cell density in the range of from 40 to 500 cells per square inch, and the cells are constructed of sheet metal layers. It is a characterizing feature of the devices of the present invention that the thermal inertia of the electrically heatable portion is less than the thermal inertia of the "light-off" portion while the respective overall cross sectional areas are the same. The axial length of the electrically heatable EHC portion is less than the axial length of the "light-off" portion, and thus the heat capacities of the two portions are different. Hence, the "cascade effect" of the devices hereof is in terms of the thermal inertia of the respective portions rather than the cross-sectional areas thereof. The electrically heatable portion and the "light-off" portion are integral in that at least some of the axially extending sheet metal leaves or layers extend over the entire axial length and are in contact with the electrically heatable sheet metal leaves or layers of the converter body. Thus, the two portions are tied together in one unit in a single housing.

What is claimed is:

1. A metallic electrically heatable converter body comprising a tubular housing and a multicellular metallic honeycomb core element contained in said housing, said core element formed of thin sheet metal layers defining a plurality of cells, each layer having marginal edges, said metal layers of said multicellular metallic honeycomb core element defining an electrically heatable portion and a "light-off" portion wherein the electrically heatable portion and the "light-off" portion are intertwined and integral, and means for supplying electric power connected to said electrically heatable portion.

2. A converter body as defined in claim 1 wherein at least one of said thin sheet metal layers is corrugated.

3. A converter body as defined in claim 1 wherein at least one of said thin sheet metal layers is thicker than the others.

4. A converter body as defined in claim 1 wherein at least one of said thin sheet metal layers is a high temperature resistive, oxidation resistant alloy having a different chemical composition from that of the other thin sheet metal layers.

5. A converter body as defined in claim 1 wherein at least one of said thin sheet metal layers is flat.

6. A converter body as defined in claim 1 wherein said means for supplying electric power includes at least a pair of electrically isolated segments.

7. A converter body as defined in claim 6 wherein said electrically isolated segments are segments of circular configuration.

8. A converter body as defined in claim 6 wherein at least one thin sheet metal layer of said electrically heatable portion includes at least one heater band having two ends, one of said ends being secured to one of said pair of electrically isolated segments and the other end being secured to another of said electrically isolated segments.

9. A converter body as defined in claim 6 wherein said layers of the electrically heatable portion include a plurality of heater bands.

10. A converter body as defined in claim 9 wherein at least one of the plurality of heater bands is corrugated.

11. A converter body as defined in claim 10 said layers of said electrically heatable portion further include flat strips and wherein each of said plurality of heater bands is corrugated and said corrugated heater bands are in alternating contiguous relation with said flat strips.

12. A converter body as defined in claim 11 wherein the flat strips of the electrically heatable portion extend continuously from one end of the core element to the other end of the core element and the light-off portion includes a plurality of corrugated strips which are not electrically heatable and in alternating contiguous relationship with said flat strips.

13. A converter body as defined in claim 12 wherein the corrugated heater bands in the electrically heatable portion are axially spaced from the corrugated strips in the light-off portion.

14. A converter body as defined in claim 13 wherein the corrugations in the corrugated electrically heatable bands in the heater portion have an amplitude and a pitch greater than the amplitude and pitch of the corrugations in the light-off portion.

15. A converter body as defined in claim 9 wherein at least one of the plurality of heater bands is flat.

16. A converter body as defined in claim 15 wherein said layers of said electrically heatable portion further include corrugated strips, and wherein each of said plurality of heater bands is flat; said flat heater bands are in alternating contiguous relation with said corrugated strips.

17. A converter body as defined in claim 16 wherein the corrugated strips of the electrically heatable portion extend continuously from one end of the core element to the other end of the core element and the light-off portion includes a plurality of flat strips which are not electrically heatable and in alternating contiguous relationship with said corrugated strips.

18. A converter body as defined in claim 17 wherein every other flat thin metal strip of the light-off portion extends continuously from one end of said multicellular honeycomb core element to the other end of said multicellular honeycomb core element, and said every other flat thin metal strip is not electrically heatable.

19. A converter body as defined in claim 1 wherein said thin sheet metal layers comprise at least one pair of thin metal strips in contiguous relation.

20. A converter body as defined in claim 19 wherein said at least one pair of thin sheet metal strips includes a corrugated strip and a flat strip.

21. A converter body as defined in claim 20 wherein said corrugated strip and said flat strip are joined together over at least a portion of the contiguous relation.

22. A converter body as defined in claim 21 wherein said corrugated strip and said flat strip are joined together by metal over at least a portion of the contiguous relation.

23. A converter body as defined in claim 22 said corrugated strip and said flat strip are joined together by fused brazing metal.

24. A converter body as defined in claim 20 wherein said corrugated thin metal strip has a coating including a refractory metal oxide of a first kind, and said flat thin metal strip has a coating including a refractory metal oxide of a second kind.

25. A converter body as defined in claim 24 wherein the coating including a refractory metal oxide of a first kind also includes a noble metal catalyst.

26. A converter body as defined in claim 24 wherein the coating including a refractory metal oxide of a second kind also includes a noble metal catalyst.

27. A converter body as defined in claim 25 wherein said cells are straight-through cells.

28. A converter body as defined in claim 1 wherein at least one of said sheet metal layers is pleated.

29. A converter body as defined in claim 28 wherein said at least one of said sheet metal layers is pleated and corrugated.

30. A converter body as defined in claim 29 wherein said at least one of said sheet metal layers is also provided with an overfolded edge along at least one of the marginal edges.

31. A converter body as defined in claim 30 wherein said at least one of the marginal edges with respect to fluid flow direction is the upstream edge.

32. A converter body as defined in claim 30 wherein said at least one of the marginal edges is the downstream edge.

33. A converter body as defined in claim 28 wherein said at least one of said sheet metal layers is pleated at an axial point intermediate the marginal edges of said at least one of said sheet metal layers.

34. A converter body as defined in claim 1 wherein at least one of said thin sheet metal layers has a coating including a refractory metal oxide on one side, and a coating including a different refractory metal oxide on the other side.

35. A converter body as defined in claim 1 wherein at least one of said thin sheet metal layers has a coating including a refractory metal oxide on one side, and a zeolite coating on the other side.

36. A converter body as defined in claim 1 wherein at least one of said thin sheet metal layers has a coating including a refractory metal oxide and a noble metal catalyst on one side, and a zeolite coating on the other side.

37. A converter body as defined in claim 1 wherein at least one of said thin sheet metal layers has a coating including a noble metal catalyst on one side, and different noble metal catalyst on the other side.

38. A metallic electrically heatable converter body as defined in claim 1 wherein said electrically heatable portion has a heated surface area of from 20 to 700 square inches.

39. A metallic electrically heatable converter body as defined in claim 1 wherein said electrically heatable portion has a cell density of from about 40 to about 500 cells per square inch.

40. In a converter having first and second converter portions in a common housing, said first converter portion being electrically heatable and said second converter portion being not electrically heatable, the improvement which comprises said first converter portion formed from a first plurality of thin sheet metal strips and said second converter portion formed from a second plurality of thin sheet metal strips, said first and second converter portions being intertwined and integral first thin sheet metal strips of said first converter portion extending into said second converter portion and the second thin sheet metal strips of said second converter portion extending into said first converter portion, said first and second thin sheet metal strips being in contiguous relation.

41. The improvement set forth in claim 40 wherein the thin sheet metal strips of the first converter portion are of a high temperature resistive, oxidation resistant alloy, and the thin sheet metal strips of said second converter portion are of a different high temperature resistive, oxidation resistant alloy.

42. The improvement set forth in claim 40 wherein the thin sheet metal strips of said first high temperature resistive, oxidation resistant alloy has a coating of refractory metal oxide thereon.

43. The improvement set forth in claim 40 wherein the thin sheet metal strips of said second high temperature resistive, oxidation resistant alloy has an adsorber/desorber coating thereon.

44. The improvement set forth in claim 43 wherein the adsorber/desorber coating is a zeolite coating.

45. The improvement set forth in claim 40 wherein the first converter portion includes means for reinforcing said first converter portion.

46. The improvement set forth in claim 40 wherein the second converter portion includes means for reinforcing said second converter portion.

47. The improvement set forth in claim 45 wherein the means for reinforcing said first converter portion includes at least one of said thin metal strip having a thicker cross section than the other thin metal strips of said first converter portion.

48. The improvement set forth in claim 46 wherein the means for reinforcing said second converter portion includes at least one of said thin metal strips, said at least one strip having a thicker cross section that the other thin metal strips of said second converter.

49. A metallic electrically heatable converter body comprising a tubular housing and a multicellular metallic honeycomb formed of thin sheet metal layers contained in said housing, said multicellular metallic honeycomb having an electrically heatable honeycomb portion and a honeycomb "light-off" portion said electrically heatable honeycomb portion and said honeycomb light-off portion being intertwined and integral, means for supplying electric power to the thin sheet metal layers forming said electrically heatable honeycomb portion, said electrically heatable honeycomb portion having a heated surface area of from 100 to 700 square inches, said electrically heatable honeycomb portion having a cell density of from about 40 to about 500 cells per square inch, and said cells being constructed of said thin sheet metal layers.

* * * * *